US005541356A

United States Patent [19]

Usa

[11] Patent Number: 5,541,356

[45] Date of Patent: Jul. 30, 1996

[54] ELECTRONIC MUSICAL TONE CONTROLLER WITH FUZZY PROCESSING

[75] Inventor: Satoshi Usa, Hamamatsu, Japan

[73] Assignee: Yamaha Corporation, Japan

[21] Appl. No.: 466,803

[22] Filed: Jun. 6, 1995

Related U.S. Application Data

[63] Continuation of Ser. No. 224,670, Apr. 7, 1994, abandoned.

[30] Foreign Application Priority Data

Apr. 9, 1993 [JP] Japan .................................... 5-083333

[51] Int. Cl.[6] ................................ G01P 3/00; G10H 1/02

[52] U.S. Cl. ................................................ 84/626; 84/662

[58] Field of Search ............................ 84/622, 626, 659, 84/662

[56] References Cited

U.S. PATENT DOCUMENTS

| | | | |
|---|---|---|---|
| 5,138,924 | 8/1992 | Ohya et al. | 84/604 |
| 5,138,928 | 8/1992 | Nakajima et al. | 84/635 |
| 5,166,464 | 11/1992 | Sakata et al. | 84/662 |
| 5,239,123 | 8/1993 | Fujita | 84/605 |
| 5,274,191 | 12/1993 | Usa | 84/626 X |
| 5,292,995 | 3/1994 | Usa | 84/626 |
| 5,308,915 | 5/1994 | Ohya et al. | 84/601 |

FOREIGN PATENT DOCUMENTS

| | | |
|---|---|---|
| 2146593 | 6/1990 | Japan . |
| 2146594 | 6/1990 | Japan . |
| 2-146094 | 6/1990 | Japan . |
| 5-19758 | 1/1993 | Japan . |

*Primary Examiner*—Jonathan Wysocki
*Assistant Examiner*—Jeffrey W. Donels
*Attorney, Agent, or Firm*—Graham & James

[57] ABSTRACT

An electronic musical tone controller having an input operator for inputting a degree of a sensory expression representing the quality of a musical tone and generating an input parameter, a controller for controlling an electrical parameter and a circuit parameter for controlling a waveform of a signal of the musical tone, a musical tone signal generator for generating a signal of the musical tone in accordance with the electrical parameter and the circuit parameter, and a logical calculation unit for performing a fuzzy calculation and generating an output parameter for controlling the electrical parameter and the circuit parameter, by using the input parameter generated by the input operator unit.

19 Claims, 18 Drawing Sheets

ELECTRONIC MUSICAL TONE CONTROLLER WITH FUZZY PROCESSING

This is a continuation of application Ser. No. 08/224,670 filed on Apr. 7, 1994, now abandoned.

BACKGROUND OF THE INVENTION

1. Field of the Invention

The present invention relates to a musical tone signal generating technology, and more particularly to a musical tone signal generating technology capable of controlling the qualities of a tone signal in accordance with human auditory senses.

2. Description of the Related Art

Natural musical instruments generate a variety of musical sounds depending on their kinds, performance techniques, and differences between instruments.

Electronic musical instruments can also generate a variety of musical sounds by changing input signals, electrical parameters, and circuit parameters, although generated musical sounds depend more or less on the type of a musical tone signal synthesizer. By editing electrical parameters and circuit parameters, it is possible to generate not only musical sounds of natural musical instruments but also musical sounds having a diversity of tone colors.

An envelope of an attenuating type musical tone signal such as a tone signal of a piano is generally decomposed into an attack (A), a decay (D), a sustain (S), and a release (R). The waveform of such a tone signal can be analyzed and synthesized by changing the level and rate of these parameters.

In a synthesizer or the like, A, D, S, and R envelope shapes and sinal waveforms themselves are directly controlled. A player of a synthesizer has been required to control electrical parameters and circuit parameters of a sound source circuit in order to produce desired musical sounds.

It is therefore necessary for a player to have knowledge of which parts of a synthesizer are operated in what manner in order to make musical sounds slightly "sharp" or "soft". In addition, such an operation by a player is very cumbersome.

An electronic musical instrument ("ELECTONE" available from Yamaha, Japan) having a slider unit called a "brilliance" unit is known. The brilliance slider unit can change only the peak level of an FM sound source.

The qualities of musical sounds can be defined easily by using sensory expressions such as "warmness", "sharpness", and "brightness".

The qualities of tone signals generated by a sound source circuit can be defined easily by electrical parameters and circuit parameters such as envelope, frequency characteristics, vibrato, and localization (orientation).

It is not easy to have a definite correspondence between sensory expressions of tone colors, and electrical parameters and circuit parameters. It is difficult for a beginner to produce desired musical tones.

Recently, fuzzy logics have been used in various technical fields. Also in the field of electronic musical instruments, a technique has been proposed as disclosed, for example, in JP-A-2-146094. According to this technique, an envelope of a musical tone signal is controlled through fuzzy calculations using an initial touch representing the key depression speed and a key-on time representing a time while the key is maintained depressed.

SUMMARY OF THE INVENTION

An object of the present invention is to provide an electronic musical instrument capable of readily obtaining a correspondence between sensory expressions of the qualities of musical tones, arid electrical parameters and circuit parameters.

Another object of the present invention is to generate, in real time, musical tones intended by a player by combining preset sensory expressions with electrical parameters and circuit parameters set by an actual musical performance.

According to one aspect of the present invention, an electronic musical tone controller is provided which has an input operator unit for inputting a degree of a sensory expression representing the quality of a musical tone and generating an input parameter, a controller for controlling an electrical parameter and a circuit parameter for controlling a waveform of a signal of the musical tone, a musical tone signal generator for generating a signal of the musical tone in accordance with the electrical parameter and the circuit parameter, and a logical calculation unit for performing a fuzzy calculation and generating an output parameter for controlling the electrical parameter and the circuit parameter, by using the input parameter generated by the input operator unit.

The logical calculation unit performs a fuzzy calculation so as to generate an output parameter for controlling the electrical parameter and the circuit parameter, by using the input parameter generated by the input operator unit by inputting a desired degree of a sensory expression representing the quality of a musical tone. Accordingly, a musical tone having a desired quality can be generated easily.

According to another aspect of the present invention, an electronic musical tone controller is provided which has an input operator unit for inputting a degree of a sensory expression representing the quality of a musical tone and generating an input parameter, a musical tone signal generator for generating a signal of the musical tone having a waveform determined by an inputted musical tone parameter, a definition unit for storing definition information defining a correspondence between the input parameter and the musical tone parameter, and a musical tone parameter generating means for generating the musical tone parameter corresponding to the value of the input parameter in accordance with the definition information.

The musical tone parameter generating means generates a musical tone parameter corresponding to the value of an input parameter generated by the input operator unit by inputting a desired degree of a sensory expression representing the quality of a musical tone, in accordance with the definition information defining a relationship between the input parameter and the musical tone parameter. Accordingly, a musical tone having a desired quality can be generated easily.

According to another aspect of the present invention, an electronic musical tone controller is provided which has an input operator unit for generating a plurality of input parameters, a performance operator unit for generating performance information in response to playing a musical performance, a musical tone signal generator for generating a musical tone signal having a waveform determined by an inputted musical tone parameter, a definition unit for storing definition information defining a correspondence between the plurality of input parameters and the performance information, and the musical tone parameter, preparatory information generating means for generating preparatory information corresponding to a combination of the plurality of input parameters, and musical tone parameter generating means for generating the musical tone parameter in accordance with the definition information and in accordance with the preparatory information and the performance information.

A calculation necessary for generating a musical tone parameter in accordance with a plurality of input parameters and performance information is performed not after to playing a musical performance. Instead, prior to playing a musical performance, preparatory information is generated in accordance with a plurality of input parameters entered from the input parameter unit, and musical parameters are generated in accordance with the performance information sequentially entered from the performance operator unit and the preparatory information. Accordingly, the amount of the calculation necessary for generating a musical tone to be performed concurrently with playing a musical performance can be reduced so that a musical tone matching the plurality of input parameters and performance information can be generated in real time concurrently with an input of the performance information.

BRIEF DESCRIPTION OF THE DRAWINGS

FIG. 8 is a schematic block diagram explaining fuzzy calculations to be executed by the electronic musical tone controller.

FIGS. 6A, 6B, and 6C are schematic diagrams explaining how an output rule is determined by using output membership functions, in which FIG. 6A shows an example of levels set for each edit output membership function, FIG. 6B shows an example of a level set for a standard membership function, and FIG. 6C shows an example of a center of gravity which determines an output numerical value.

FIGS. 16A, 16B, and 16C are schematic diagrams explaining the operation of a fuzzy processor, in which FIG. 16A is a block diagram showing the structure of the fuzzy processor, FIG. 16B is a schematic diagram explaining the function of a min function generator circuit, and FIG. 16C is a schematic diagram explaining the functions of a max calculation circuit and a center of gravity calculation circuit.

DETAILED DESCRIPTION OF THE PREFERRED EMBODIMENTS

Figure 1:
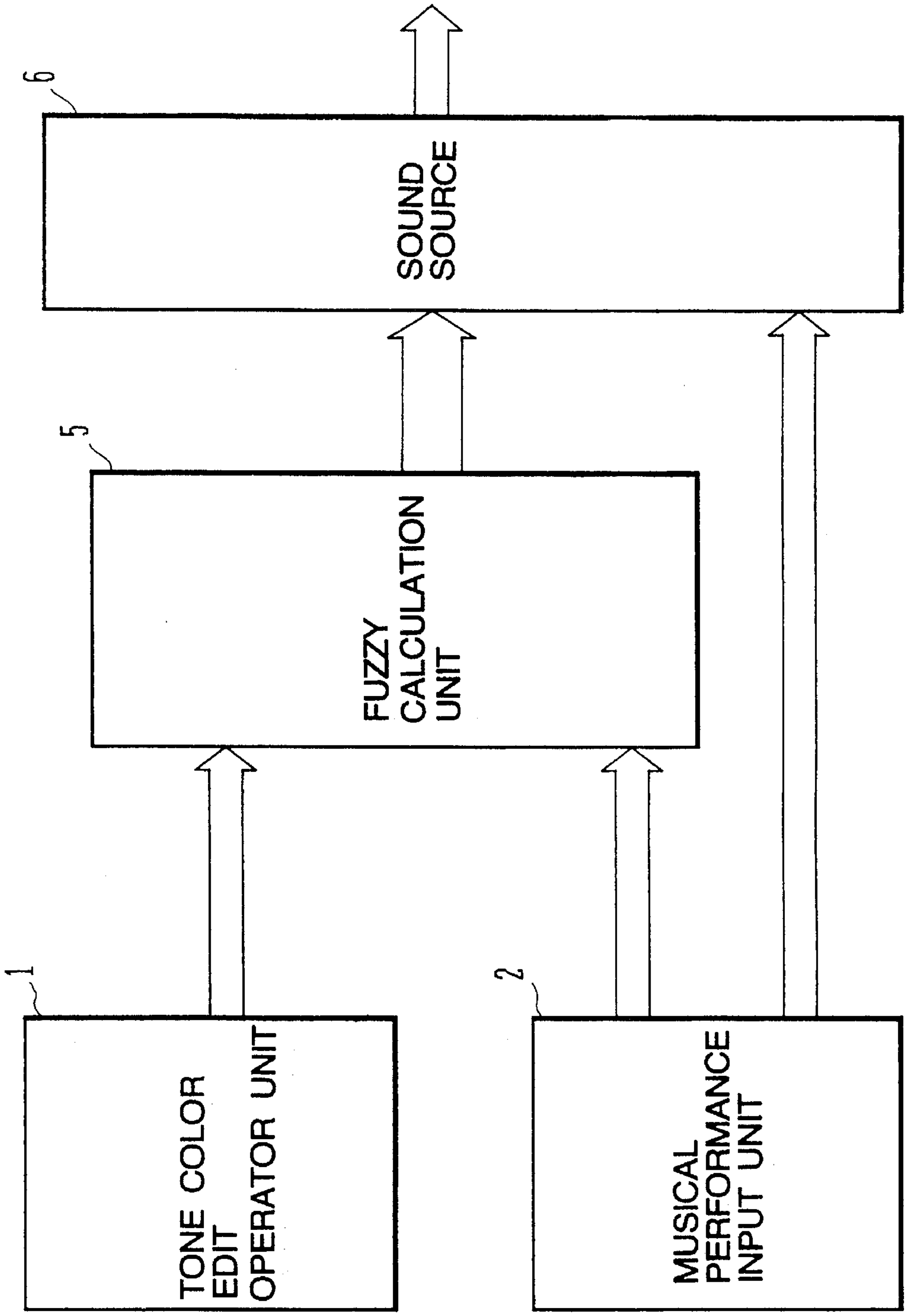
FIG. 1 is a schematic block diagram showing the fundamental structure of an electronic musical tone controller according to an embodiment of this invention.

FIG. 1 is a block diagram showing the fundamental structure of an electronic musical tone controller according to an embodiment of the present invention.

A tone color edit operator unit 1 is used for inputting sensory expressions such as "sharpness", "warmness", and "brightness". A signal entered by the tone color edit operator unit 1 is inputted to a fuzzy processor unit 5.

A musical performance input unit 2 is, for example, a keyboard for playing a general musical performance, and generates musical tone control signals for playing a musical performance, such as a key-on signal, a key-off signal, a key code signal, and an initial touch (velocity) signal.

The fuzzy processor unit 5 processes data inputted from the tone color edit operator unit 1 and supplies the fuzzy calculation results to a sound source circuit 6. The sound source circuit 6 generates a musical tone signal in accordance with a musical performance signal supplied from the musical performance input unit 2 and a musical tone control signal supplied from the fuzzy processor unit 5.

The fuzzy processor unit 5 can process also musical tone control signals entered by the musical performance input unit 2.

The sound source circuit 6 may be one of various sound sources realized by a waveform memory type sound source such as an AWM sound source, an FM sound source, and a physical model sound source. Musical tone control signals suitable for each kind of a sound source circuit 6 are supplied thereto.

The tone color edit operator unit 1 is a control unit easy for a player to input sensory expressions which are easy to understand sensorily. The fuzzy processor unit 5 performs various calculations so as to match sensory expressions entered from the tone color edit operator unit 1 with various control parameters of the sound source circuit 6.

A more detailed embodiment of this invention will be described.

Figure 2A:
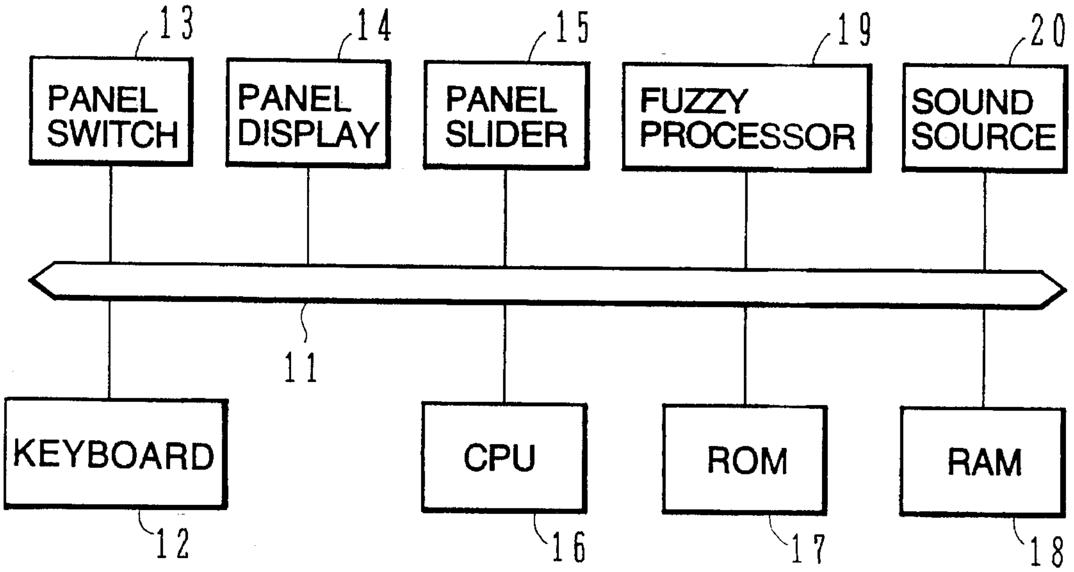
FIG. 2A is a schematic block diagram showing a hardware arrangement of the electronic musical tone controller of the embodiment.
Figure 2B:
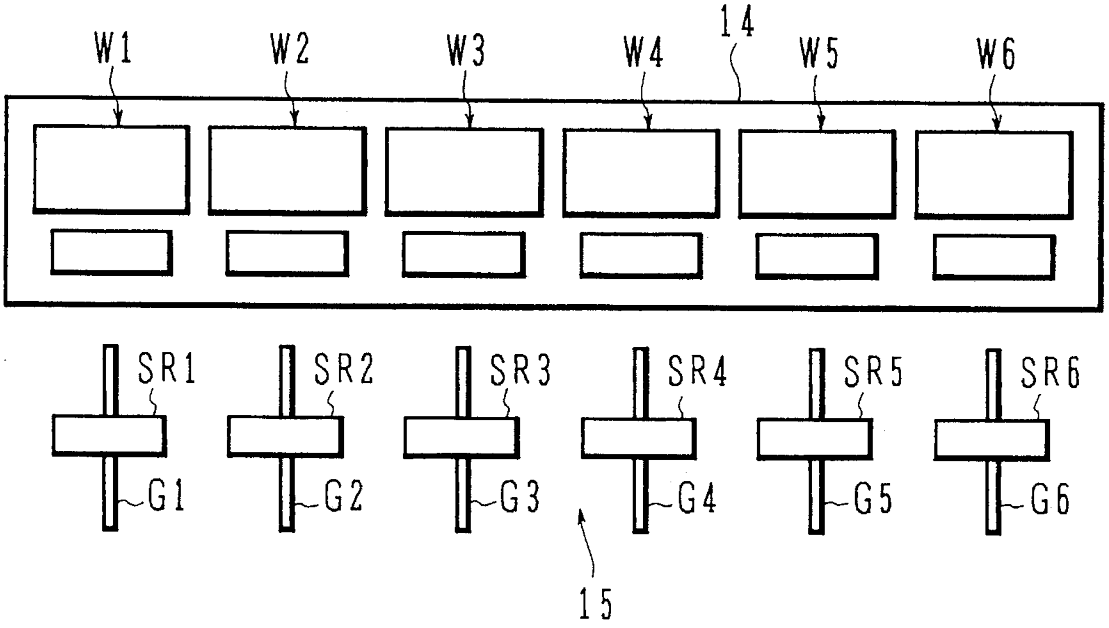
FIG. 2B is a schematic plan view showing a panel display and panel sliders.

FIGS. 2A and 2B are schematic block diagrams showing the structure of an electronic musical tone controller according to the present invention. FIG. 2A is a block diagram showing the structure of the electronic musical tone controller. A bus line 11 is a signal path for data transfer between various system components of the controller. A keyboard 12 for playing a general musical performance is connected to the bus line.

The keyboard 12 has a number of keys which are depressed and released to generate various control signals such as a key code KCD signal representing a pitch, a key-on KON signal representing a generation of a musical tone signal, a key-off KOFF signal representing a cessation of a musical tone signal, and an initial touch (velocity) IT signal representing a velocity of a performance operation.

A panel switch group 13 including a tone color select switch, a mode select switch, and other switches sets a fundamental operation mode of the electronic musical tone controller. A panel display 14 mounted on a panel of the controller is, for example, a liquid crystal display for displaying various information.

A panel slider group including a plurality of sliders made of slide resistors edits sensory expressions representing the qualities of musical tones. While each panel slider 15 is operated, an input rule name and a set level are displayed on the panel display.

A player can edit a tone color while recognizing from a displayed input rule name what sensory expression the panel slider 15 under operation has. An input rule name is preferably a concept name exactly representing a sensory expression.

A central processing unit (CPU) 16 generates general musical tone control signals in accordance with a performance operation signal entered from the keyboard 12, and performs a predetermined fuzzy calculation in accordance with a fuzzy operation signal entered from the panel slider 15.

A read-only memory (ROM) 17 stores programs to be executed by CPU 16 and other data. A random access memory (RAM) 18 includes registers for storing various parameters calculated by CPU 16 and other memories.

A fuzzy processor 19 is a processor for performing a fuzzy calculation in real time in accordance with a performance operation signal entered from the keyboard 12. For example, the fuzzy processor 19 performs a fuzzy calculation on a tone color which is entered from the panel slider 15 and processed by CPU 16, while considering an initial touch signal entered from the keyboard 12.

Since performance operation signals are sequentially generated in response to performance operations entered from the keyboard 12, the fuzzy processor 19 is required to perform fuzzy calculations by using the inputted performance operation signals in real time.

Musical tone control signals generated by CPU 16 and those processed by the fuzzy processor 19 are both sent to a sound source circuit 20 to control musical tone signals. An output signal from the sound source circuit 20 is supplied to a sound system which produces a corresponding audible sound.

In this embodiment, tone colors can be edited in various manners by selecting a tone color edit mode and entering various sensory expressions from the panel slider group 15.

FIG. 2B shows an example of the structure of the panel slider group 15 and the panel display 14. The panel slider group 15 has, for example, six slider resistors SR1 to SR6.

Each slider SR is adapted to be slidable along a groove G formed in the panel, and is used for inputting predetermined rules assigned to each slider SR. Input rules are sensory expressions of human auditory senses.

The panel display 14 is mounted above the panel slider group 15, and has window areas W corresponding to respective sliders SR. As shown, each window area W contains an input rule name display sub-area and an input rule level display sub-area.

Preferably, each slider SR can input a pair of two input rules having opposite sensory expressions. For example, the first slider SR1 inputs "sharp—soft" rules. CPU 16 performs a fuzzy calculation of input rules in accordance with an inputted set tone color and outputs predetermined output rules.

Figure 3:
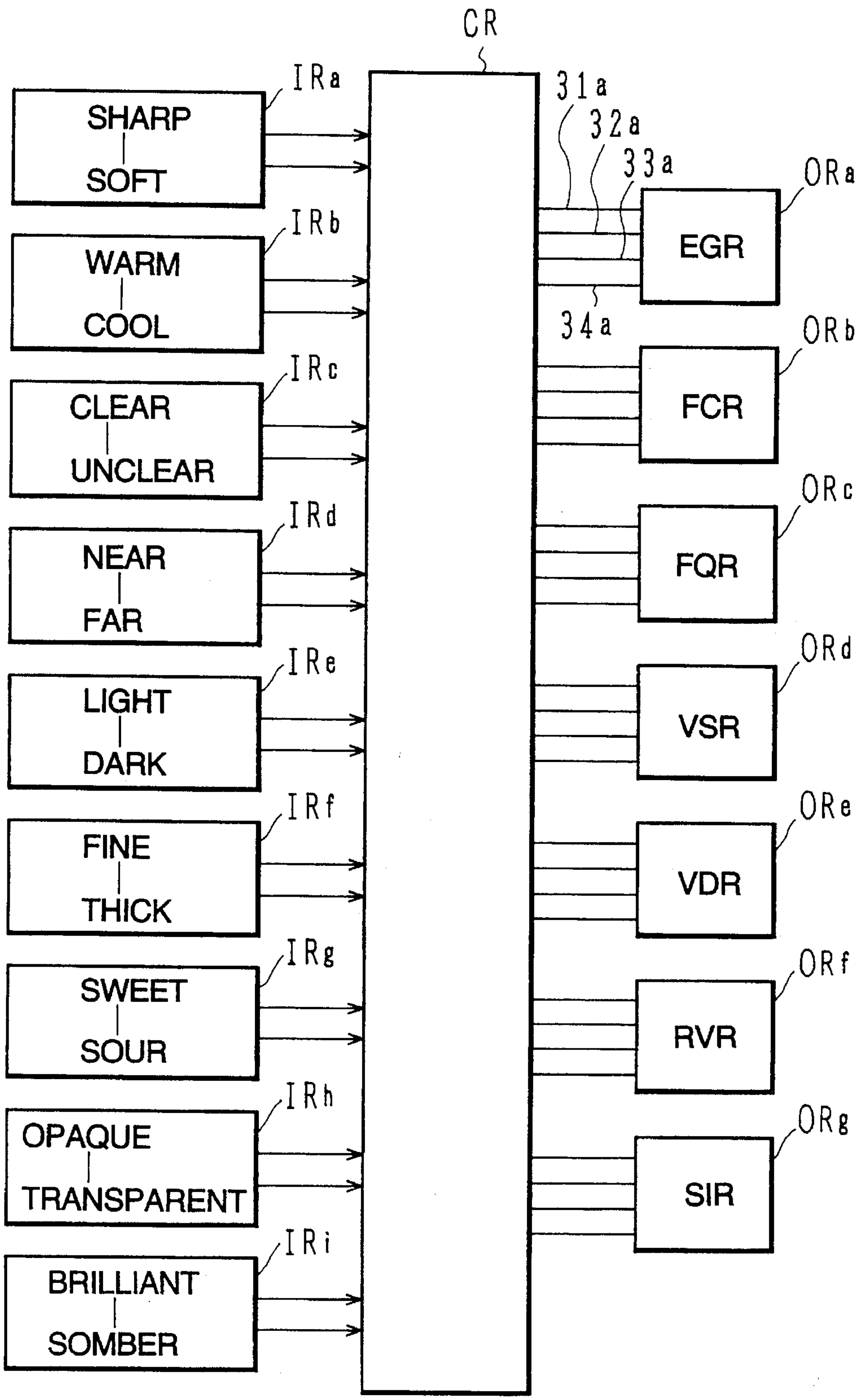

FIG. 3 is a schematic block diagram illustrating fuzzy calculations to be executed by CPU 16. Input rules IR include a number of pairs of two input rules having opposite sensory expressions, such as "sharp—soft", "warm—cool", "clear—unclear", "near—far", "light—dark", "fine—thick", "sweet—sour", "opaque—transparent", and "brilliant—somber". Each pair of two input rules provides two input levels.

Output rules OR are control signals for controlling the sound source circuit 20, such as a signal EGR for controlling the rising speed of an envelope, a filter cut-off frequency signal FCR, a filter Q signal FQR, a vibrato speed signal VSR, a vibrato depth signal VDR, a reverberation amount signal RVR, and a stereo same/opposite phase signal SIR.

Combinations of the input rules IR and output rules OR are optionally determined and they are related each other by control rules CR. Although predetermined standard control rules CR are provided, a player can edit them as desired. When one pair of input rules IR is selected and its setting level is changed, a plurality of output rules in relation with the input rules IR also change. That is to say, if a setting level of a pair of input rules IR is changed, musical tone parameters matching the sensory expressions off all input rules are newly generated. Each output rule is also controlled by a plurality of input rules.

The relationship between input rules and output rules therefore becomes complicated. Each time a pair of input rules among a plurality of input rules is changed, a fuzzy calculation is performed in order to set new output rules.

Figure 4A:
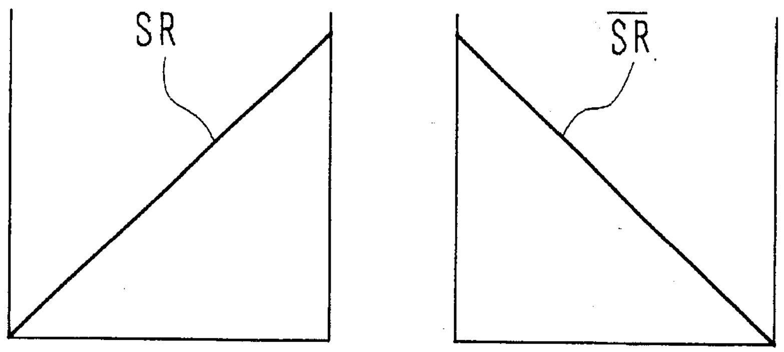
FIGS. 4A, 4B, and 4C are schematic diagrams showing examples of the shapes of input membership functions.
Figure 4B:
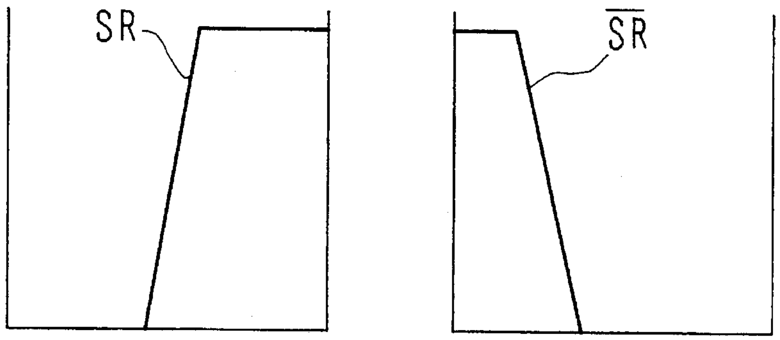
Figure 4C:
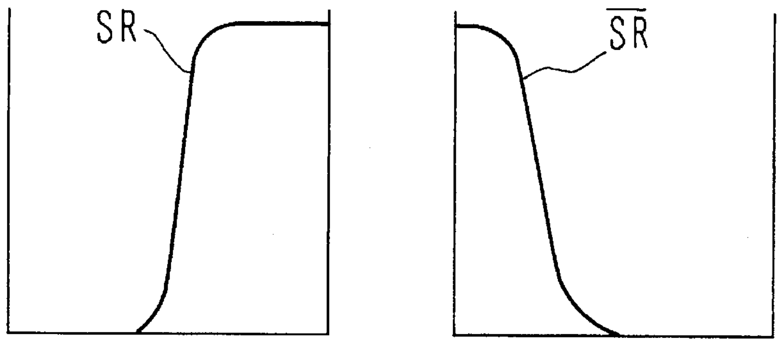

FIGS. 4A to 4C show examples of input membership functions for a fuzzy calculation. As shown in FIG. 3, each pair of two input rules has two opposite sensory expressions. When the slider SR shown in FIG. 2B is operated, input levels for the two opposite sensory expressions are generated at the same time.

FIG. 4A shows two membership functions SR and —SR changing linearly in opposite directions. FIG. 4B shows two input membership functions SR and —SR generated upon operation of the slider and changing not linearly but trapezoidally.

FIG. 4C shows two membership functions SR and —SR changing not linearly but in a curved shape. The shape of a membership function may take any other shape in addition to the above shapes. Each slider generates two input membership functions having opposite sensory expressions. The two input membership functions each may take a different shape.

Figure 5:
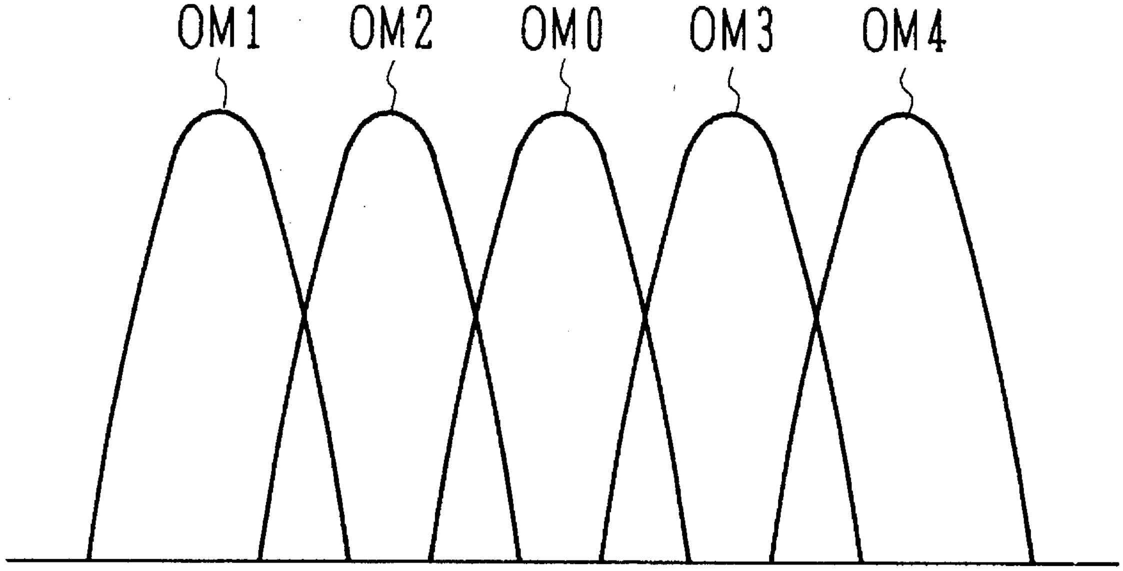
FIG. 5 is a schematic diagram showing examples of the shapes of output membership functions.

FIG. 5 shows an example of an output membership function. The shape of each output membership function can take basically any shape. This embodiment uses a combination of a standard output membership function OM0 and four output membership functions OM1 to OM4 to be edited.

One of the edit output membership functions OM1 to OM4 is related to each pair of input rules. The standard output membership function OM0 is used when no edit operation is performed, and its output level decreases according to the degree of edit operation.

If the scale of the abscissa of the output membership function is made variable for each input level to the output membership function, it is possible to provide a finer control and a desired shape of an output membership function even if the same shape is used for the edit output membership functions. The number of edit output membership functions is not limited to four.

As described previously, the relationship between input rules and output rules can be determined as desired. A control of one output rule, for example, the envelope rising speed EGR, by a plurality of input rules will be described.

Figure 6A:
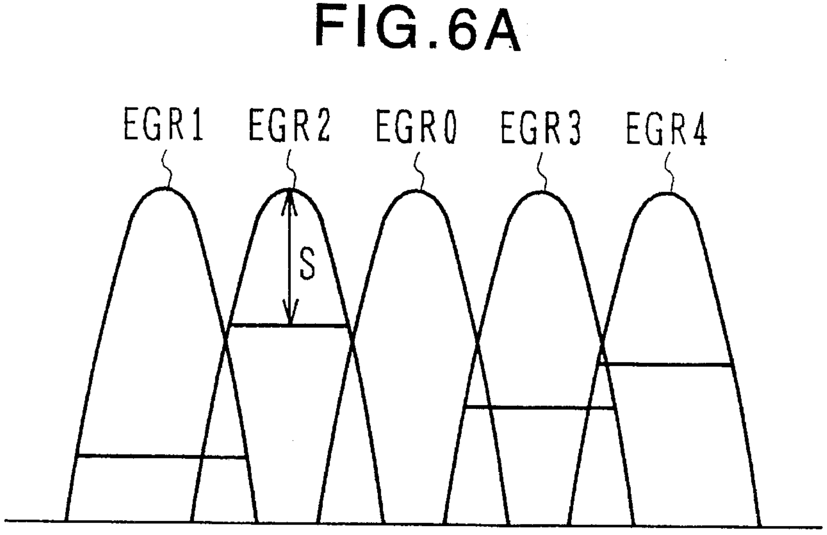

As shown in FIG. 6A, the edit output membership functions EGR1 to EGR4 for the envelope rising speed EGR are related to various input rules. If one output membership function, for example, EGR2, has a plurality of input levels set by input rules, the largest input level is selected by a max operation.

Figure 6B:
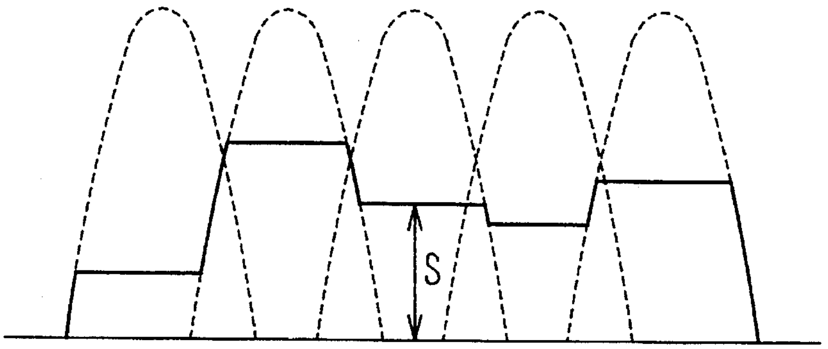
Figure 6C:
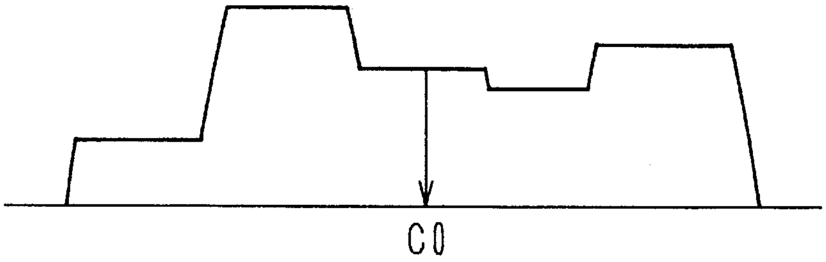

In the example shown in FIGS. 6A to 6C, all the four envelope output membership functions EGR1 to EGR4 are selected. All the four output membership functions are not necessarily required to be selected. Each output membership function EGR1 to EGR4 is a function representing a "tendency" of the envelope, which is sensory expression.

A maximum level set to the edit output membership functions is selected, and a difference S between the maximum set level and the maximum value of the edit output membership function is calculated. The head of the standard output membership function EGR0 is cut by this difference level S.

In this manner as shown in FIG. 6B, the cut levels of all the output membership functions are set to form a truncated shape of each output membership function through a max operation. By using these truncated shapes, a general calculation one the center of gravity is performed and the center of gravity C0 is outputted as a numerical value of the output rule.

With these output membership functions, if no edit operation is performed, the standard output membership function EGR0 is used at it is, and if some edit operation is performed, a value of the output rule is decreased correspondingly for the standard output membership function. If the edit operation is performed greatly different from the standard output membership function, the preset value of the standard output membership function is decreased greatly.

If a plurality of output rules are controlled by inputting one kind of sensory expression, an input membership function may be selected differently for each output rule. In the above example, a plurality of edit output membership functions and one standard output membership function are used as output membership functions. A desired number of edit output membership functions may also be used.

Figure 7:
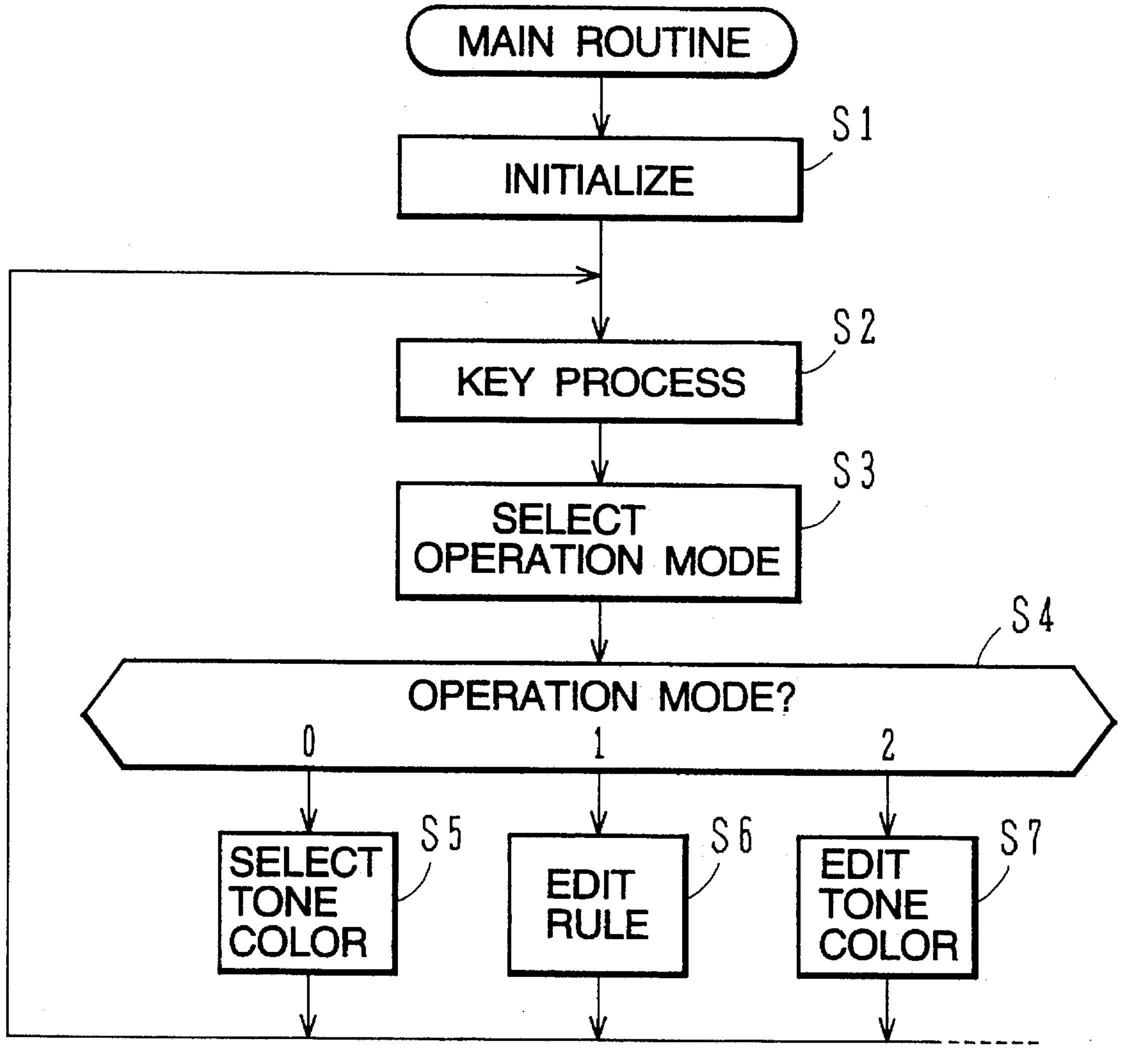
FIG. 7 is a flow chart of a main routine.

FIG. 7 is a flow chart of a main routine explaining the operation of the above-described control.

When the control starts at Step S1, initial setting is performed including initializing various registers. Upon this initial setting, the electronic musical tone controller becomes ready to operate.

Next, at Step S2, a key process for the keyboard is performed. If keys of the keyboard are operated to play a musical performance, corresponding musical tone signals are generated.

At the next Step S3, an operation mode is selected. If an operation mode select switch is activated to select an operation mode, the electronic musical tone controller selects this operation mode.

At Step S4, it is checked what mode the selected operation mode is. If the operation mode is "0", the flow advances to Step S5 to enter a tone color selection mode, if the operation mode is "1", the flow advances to Step S6 to enter a rule edit mode, and if the operation mode is "2", the flow advances to Step S7 to enter a tone color edit mode. The operation mode can select any other desired mode.

After these Steps, the flow returns to Step S2 to repeat the same processes. If a musical performance is being played by using the keyboard, the key process at Step S2 is repetitively performed by bypassing the other Steps. If the controller is in the tone color edit mode, the tone color edit process at Step S7 is repetitively performed by bypassing the other Steps. In the following, the tone color select process at Step S5, rule edit process at Step S6, and tone color edit process at Step S7 will be detailed.

FIG. SA is a flow chart of a subroutine explaining the tone color select process to be performed when a tone color select event occurs.

When the process starts at Step TS1, a selected tone color number is inputted to a buffer register BUF.

At Step TS2, the data in a tone color data buffer generated at the previous edit is transferred to a tone color memory in RAM 18 at an area corresponding to the tone color number stored in a register TC.

Figure 8A:
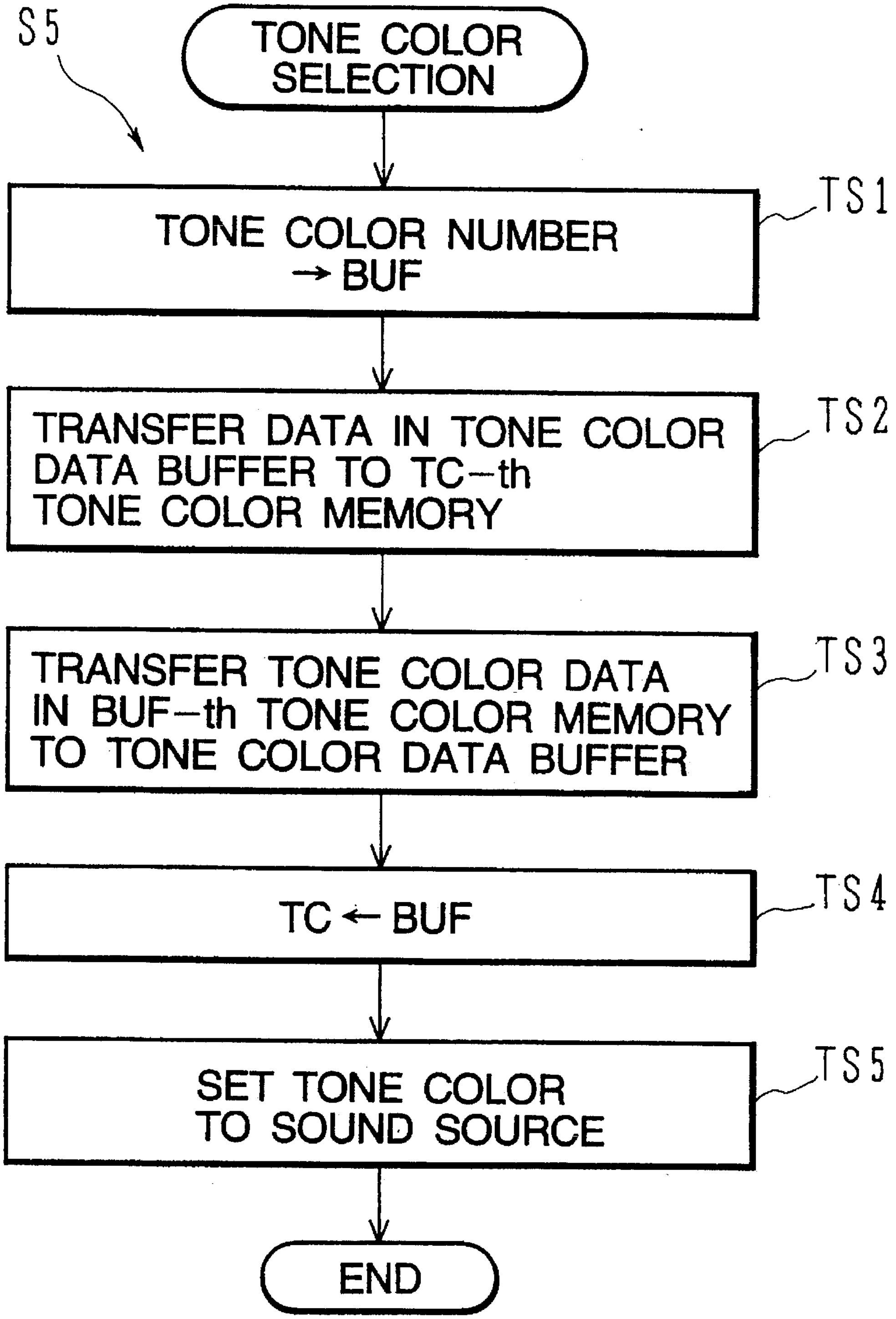
FIG. 8A is a flow chart of a tone color select subroutine.
Figure 8B:
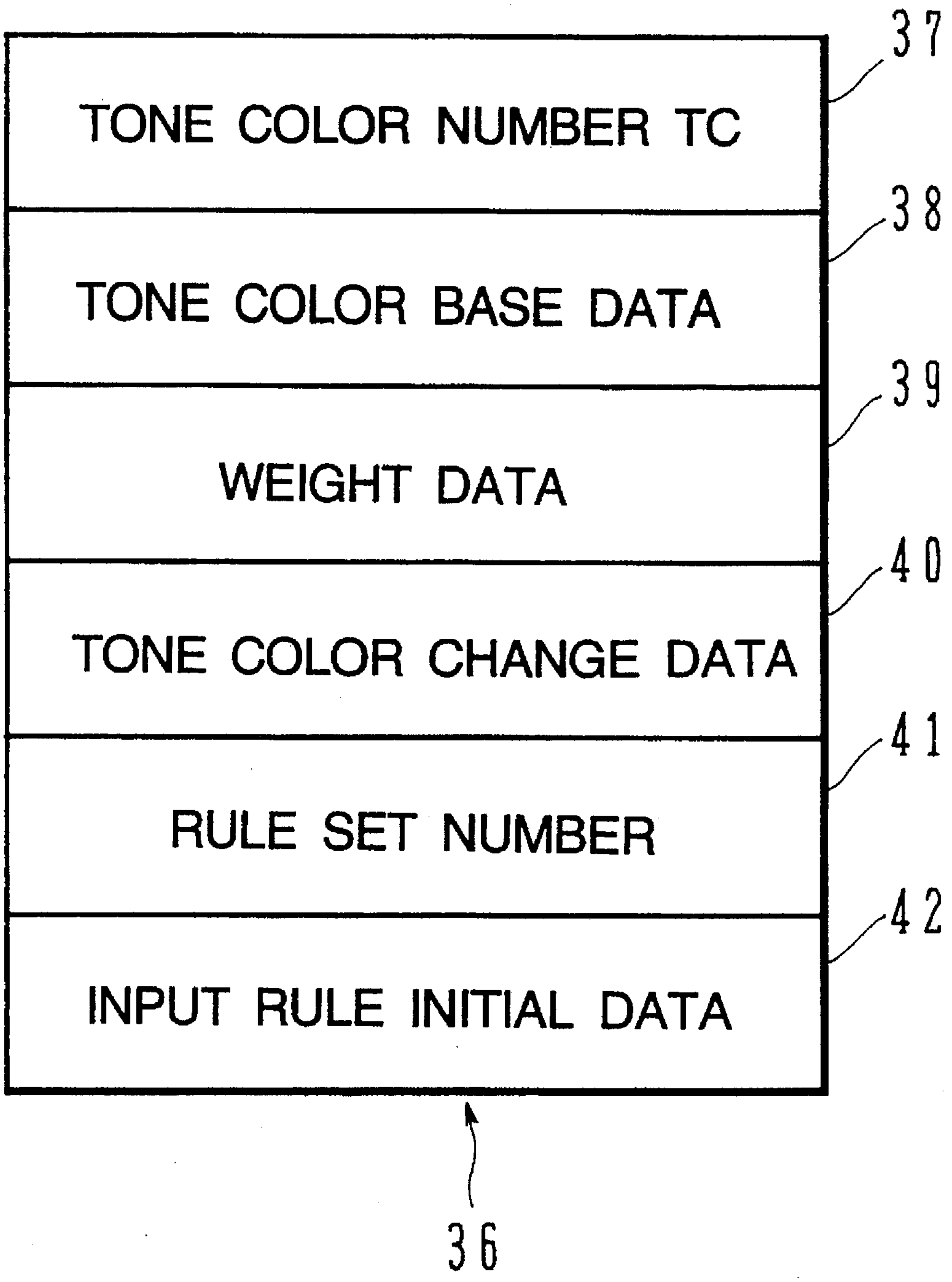
FIG. 8B shows an example of the structure of a tone color data buffer.

The tone color data buffer has a structure such as shown in FIG. 8B. The tone color data buffer 36 has an area 37 for storing a tone color number stored in the register TC, an area 38 for storing tone color basic data, a synthesized weight data area 39 for storing a weight indicating that a base data is added with another data by a ratio determined by a level shift data entered from a slider, a tone color change data area 40 for storing change data of each parameter generated through a fuzzy calculation in accordance with a level entered from a slider, a rule set number area 41 for storing an edit rule set, and an initial data area 42 for storing a level entered from a slider when the last input rule was edited.

At Step TS3, tone color data is read from the tone control memory at the area corresponding to the selected tone color number stored in the buffer BUF, and transferred to the tone color data buffer. At Step TS4, the tone color number stored in the buffer memory BUF is inputted to the tone color register TC. The tone color memory has a plurality of storage areas having the same structure as the tone color data buffer.

The tone color number stored in the register TC is referenced when the next edit results are stored in the tone color memory at the address corresponding to the tone color number TC (Step TS2).

Next, at Step TS5, a tone color is set to the sound source circuit in accordance with the tone color data read from the tone color memory, so that the sound source circuit can generate a tone signal having desired tone color.

By reading tone color data corresponding to the tone color number from the tone color memory, it is possible to generate a tone signal added with a sensory expression specific to the tone color.

Figure 9:
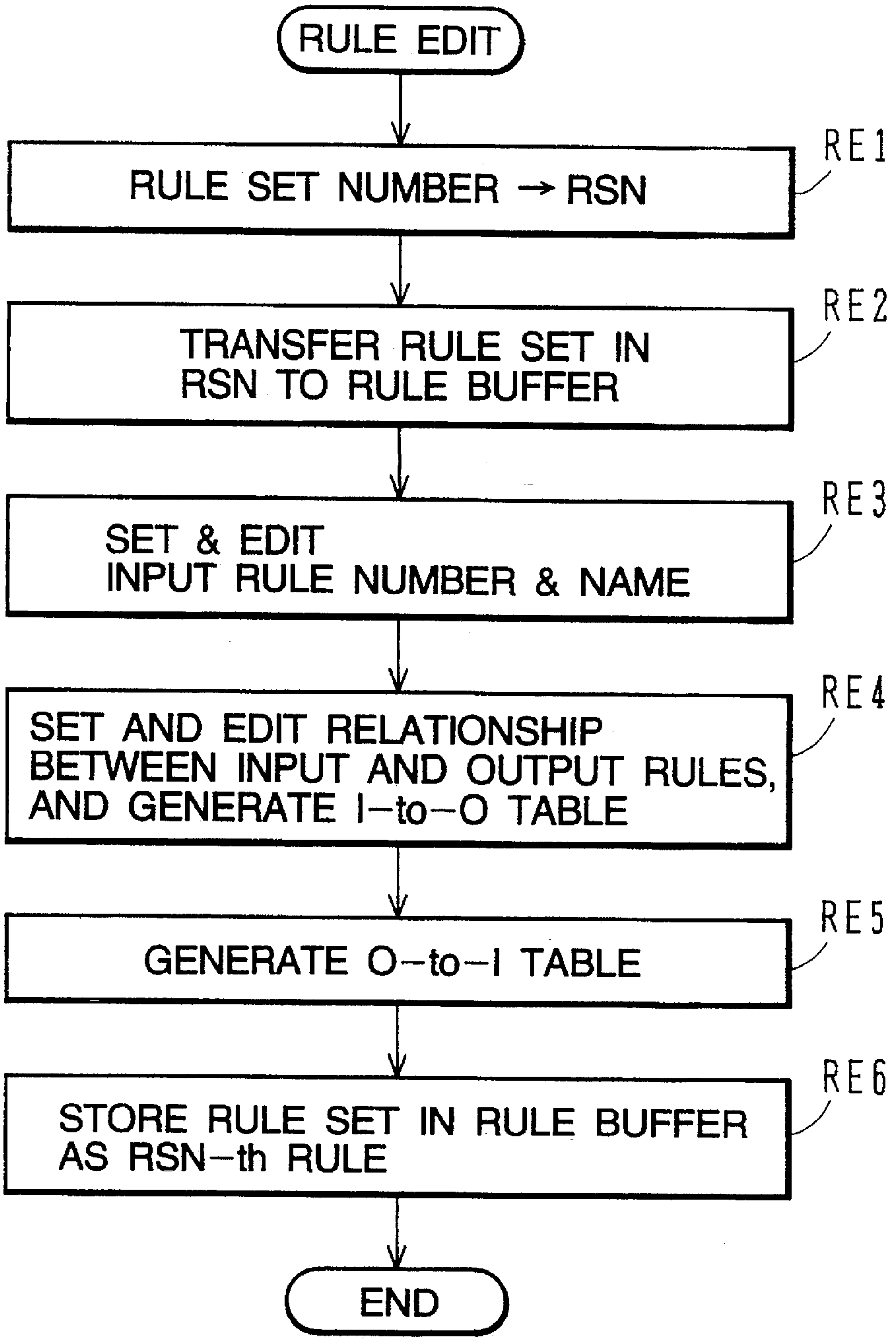
FIG. 9 is a flow chart of a rule edit subroutine.

FIG. 9 is a flow chart of a subroutine explaining the rule edit process. A rule set determines input rules, output rules, and the relationship between input and output rules. A player can change the rule set in accordance with the personal sense and preference of the player.

When the process starts at Step RE1, an input rule set number is stored in a register RSN. At Step RE2, a rule set number stored in the register RSN is read from the memory and transferred to a rule buffer.

At Step RE3, the number and name of an input rule to be edited are newly defined or set. The rule name of each rule number is stored in RAM 18 stored in the format such as shown in FIG. 12B. The rule name can be newly defined and overwritten at Step RE3. A rule name can be defined by a player as desired so as to give a concept name matching a sensory expression. The defined rule name is displayed on the display 14 of the panel slider 15 corresponding to the rule number shown in FIG. 2, and a level set by the slider 15 is also displayed.

As described previously, each input rule has a pair of two opposite sensory expressions. For example, a rule 1 indicates sharpness, a rule —1 indicates softness, a rule 2 indicates warmness, a rule —2 indicates coolness, a rule 3 indicates clearness, a rule —3 indicates unclearness, a rule 4 indicates near distance, a rule —4 indicates far distance, a rule 5 indicates brightness, a rule —5 indicates darkness, a rule 6 indicates fineness, a rule —6 indicates thickness, a rule 7 indicates opaqueness, and a rule —7 indicates transparency.

Other rules may also be used. Six edit sliders are used so that six rule pairs can be entered at the same time. If more rule pairs are to be entered, combinations of six edit sliders are assigned particular input rules.

At Step RE4, the relationship from input rules toward output rules, i.e., which output rules are controlled by which input rules, is defined or edited to form an I-to-O table.

For example, sharpness of an input rule is related to output rules of EGR4 indicating a large attack rate, of FCR4 indicating a high filter cut-off frequency, of FER4 indicating a large filter Q, of VSR4 indicating a fast vibrato speed, and of VDR1 indicating a shallow vibrato. A weight of each input rule can be set independently for each relationship between input and output rules.

Softness of an input rule having an opposite concept to sharpness is related to output rules, for example, of EGR2 indicating a slightly small attack rate, of FCR1 indicating a low cut-off frequency, of VSR2 indicating a slightly slow vibrato speed, and of VDR4 indicating a deep vibrato.

It is not necessary to select the same output rules even if the input rules 1 arid —1 have opposite concepts. In the above example, the filter Q is not selected for softness but selected for sharpness.

For clearness of the input rule 3, output rules of FCR4 indicating a high filter cut-off frequency, of FGR4 indicating a large envelope attack rate, and of SIR4 indicating a large opposite phase component can be set.

If sharpness of the input rule 1 and clearness of the input rule 3 are independently related to output rules, the same output rules of FCR4 and EGR4 are duplicately set in the above example. In such a case, a maximum level among the levels set for the same output rule is selected.

In the manner described above, a player can set a relationship between input and output rules on a trial and error basis and generate tone color parameters matching sensory expressions.

When one input rule is edited, a plurality of output rules change. Each output rule is also influenced by other input rules. It is therefore necessary to store a backward relationship from output rules toward input rules.

At Step RE5, an O-to-I table is generated in accordance with the I-to-O table. At Step RE6, the rule set in the rule buffer determined in the above manner is stored as a rule set having a rule set number RSN.

Figure 10:
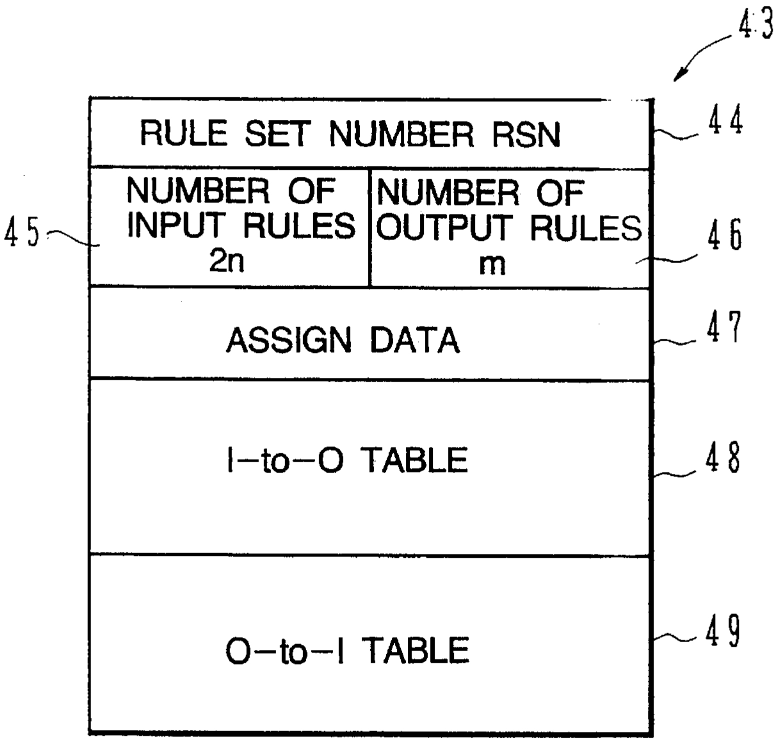
FIG. 10 is a schematic diagram showing an example of a rule buffer.

FIG. 10 shows an example of the structure of the rule buffer. This rule buffer 43 contains an area 44 for storing a rule set number RSN, an area 45 for storing the number 2*n* of input rules, an area 46 for storing the number m of output rules, an area 47 for storing assign data indicating a correspondence between each slider and an input rule, an area 48 for storing the I-to-O table indicating a relationship from input rules toward output rules, and an area 49 for storing the O-to-I table indicating a correspondence from output rules toward input rules.

Figure 11:
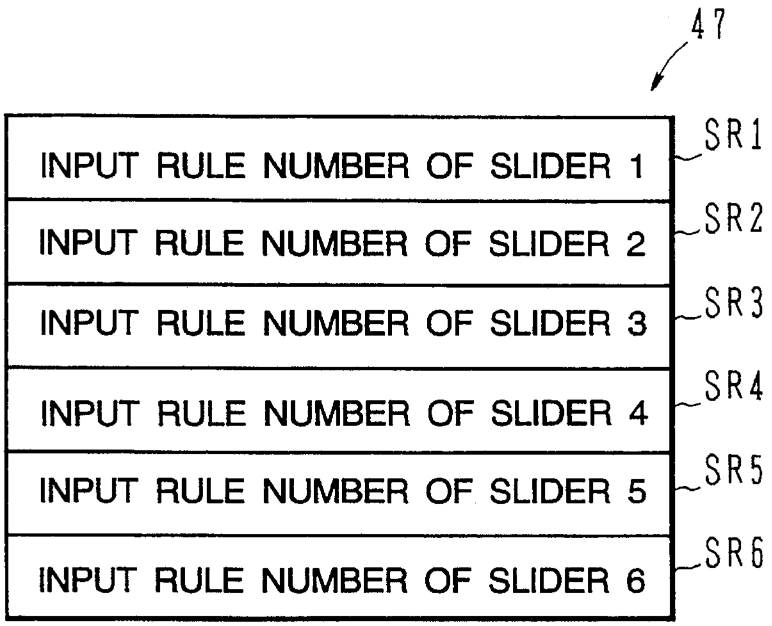
FIG. 11 is a schematic diagram showing an example of the structure of an assign data storage area.

The assign data area 47 has a structure such as shown in FIG. 11. This area 47 contains an area SR1 for storing an input rule number assigned to the slider 1, an area SR2 for storing an input rule number assigned to the slider 2, . . . , and an area SR6 for storing an input rule number assigned to the slider 6.

Figure 12A:
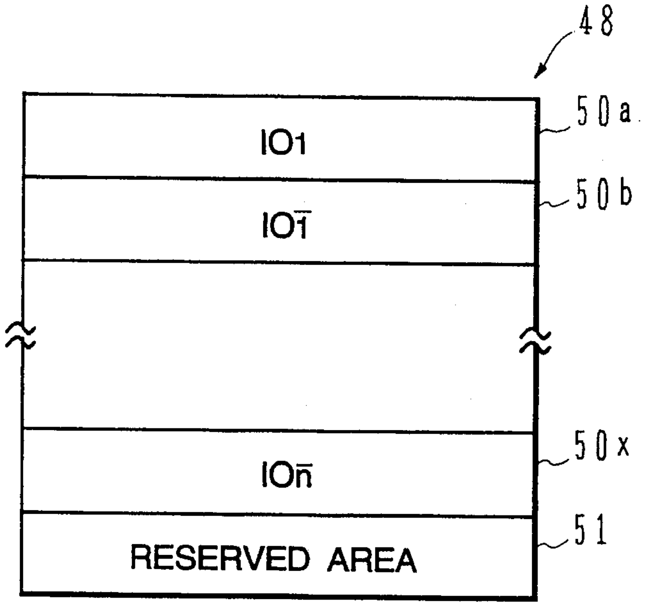
FIG. 12A is a schematic diagram showing an example of the structure of an I-to-O table.
Figure 12B:
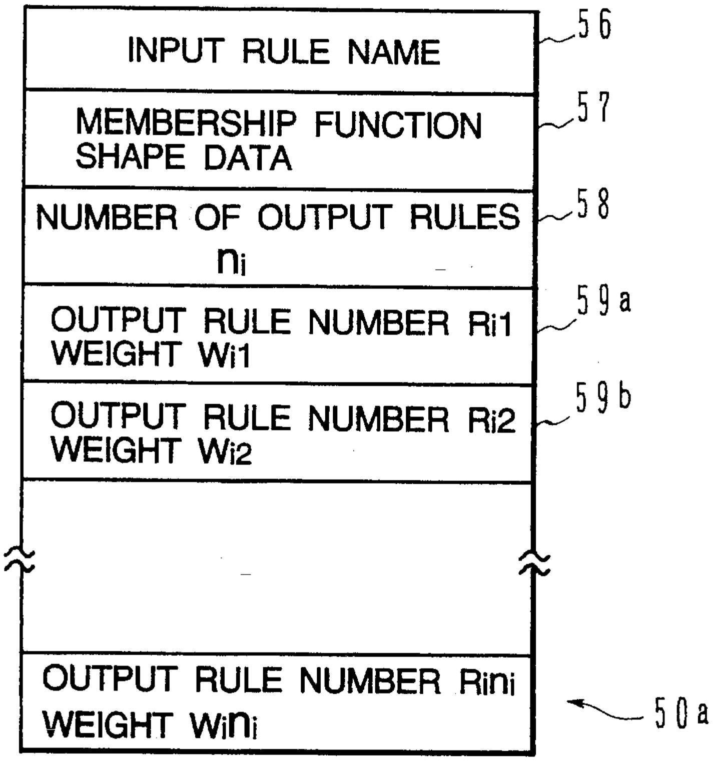
FIG. 12B is a schematic diagram showing an example of the structure of a storage area of the I-to-O table.

The I-to-O table area 48 has a structure such as shown in FIG. 12A. This area contains areas 50*a*, 50*b*, . . . , 50*x* for storing output rules 0 associated with each input rule I, and a reserved area 51.

The area for storing a relationship between one input rule and output rules, for example, the area $IO_1$, has a structure such as shown in FIG. 12B. This area 50*a* contains an area for storing an input rule name, an area 57 for storing data for designating the shape of an input membership function, an area 58 for storing the number ni of output rules and areas 59*a*, 59*b*, . . . , for storing an output rule number and a weight for each output rule.

Figure 13A:
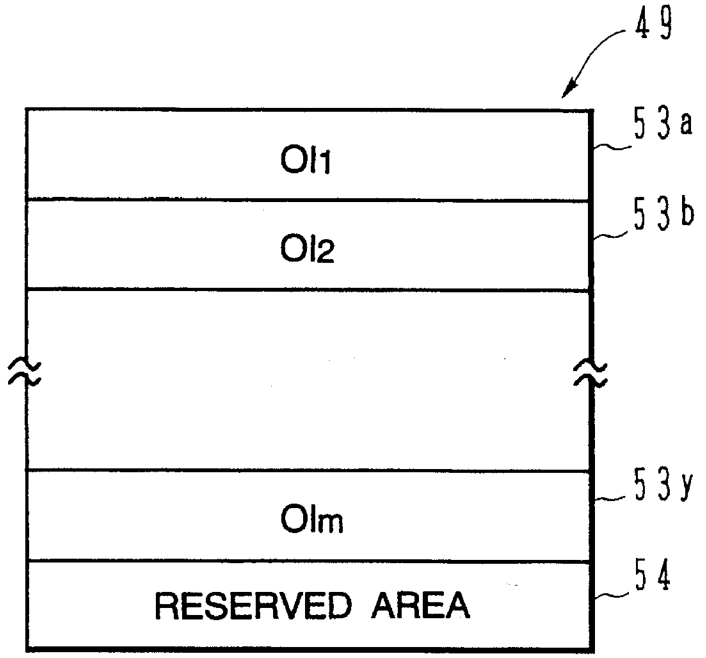
FIG. 13A is a schematic diagram showing an example of the structure of an O-to-I table.

The O-to-I table area 49 has a structure such as shown in FIG. 13A. This area contains areas 53*a*, 53*b*, . . . , 53*y* for storing a relationship between each output rule and associated input rules, and a reserved area 54.

Figure 13B:
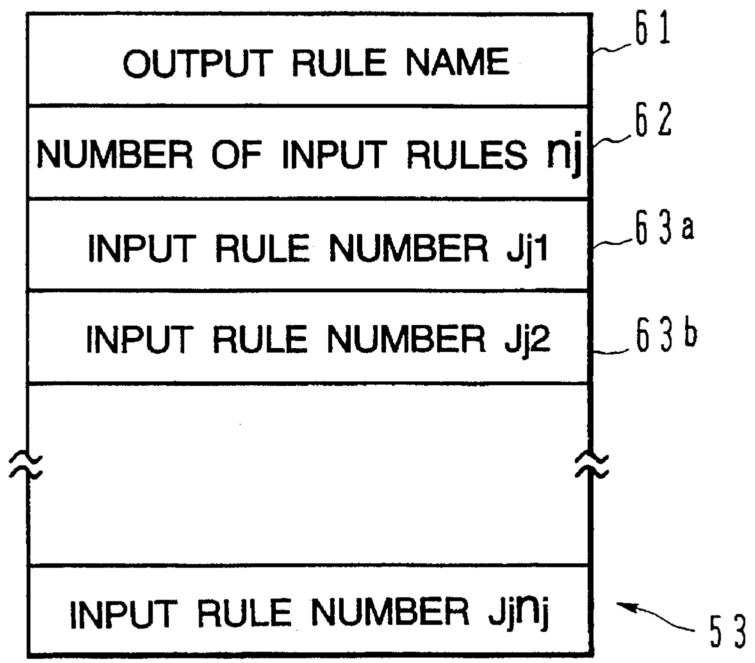
FIG. 13B is a schematic diagram showing an example of the structure of a storage area of the O-to-I table.

Each area 58 has a structure such as shown in FIG. 13B. This area 53 contains an area 61 for storing an output rule name, an area for storing the number of associated input rules, and areas for storing associated input rule numbers.

Figure 14:
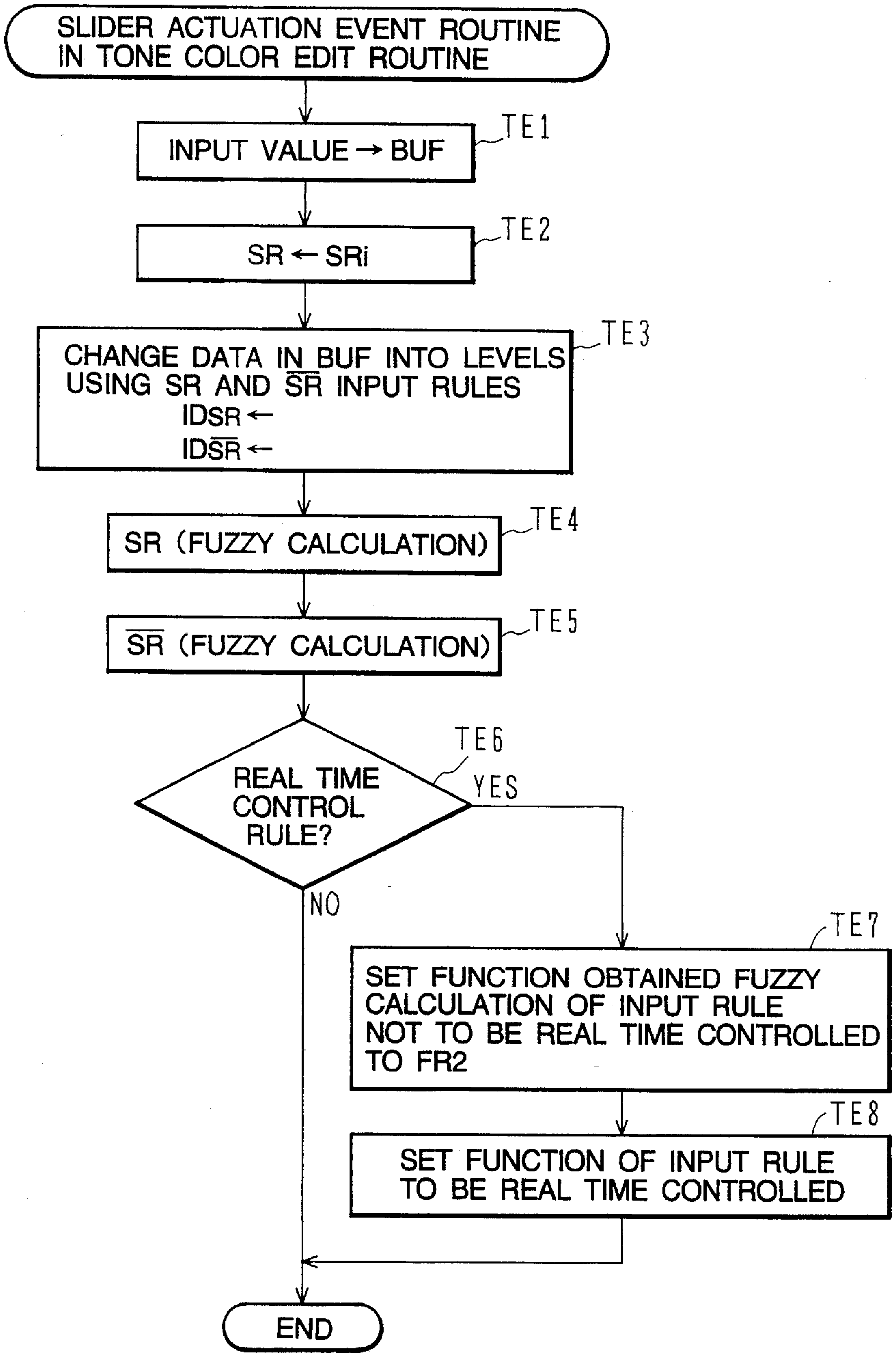
FIG. 14 is a flow chart of a slider actuation event routine in the edit routine.

FIG. 14 is a flow chart of an event routine upon actuation of the i—the slider SRi when a tone color edit is performed in accordance with a preset or edited rule set. When the slider 15*i* is actuated, the input value is stored in a buffer BUF at Step TE1. At Step TE2, an input rule assigned to the i—the slider SRi is copied to a register SR.

At Step TE3, data in the buffer BUF is converted into numerical values representing the tendency of the input data in accordance with the shapes of the membership functions of the SR-th and —SR-th input rules, and the numerical values are stored in registers $ID_{SR}$ and $ID_{-SR}$.

At Step TE4, a fuzzy calculation for SR is performed, and at Step TE5 a fuzzy calculation for —SR is performed.

At Step TE6, it is checked whether there is a rule for which fuzzy calculation is controlled in real time. If there is a real time control rule, the flow follows a YES arrow to move to Step TE7. At this Step TE7, a function obtained by the fuzzy calculation of an input rule not to be controlled in real time is set to a register FR2, and at Step TE8, a membership function of an input rule to be controlled in real time is set to a register FR1. If there is no input rule to be controlled in real time, Steps TE7 and TE8 are bypassed.

Figure 15:
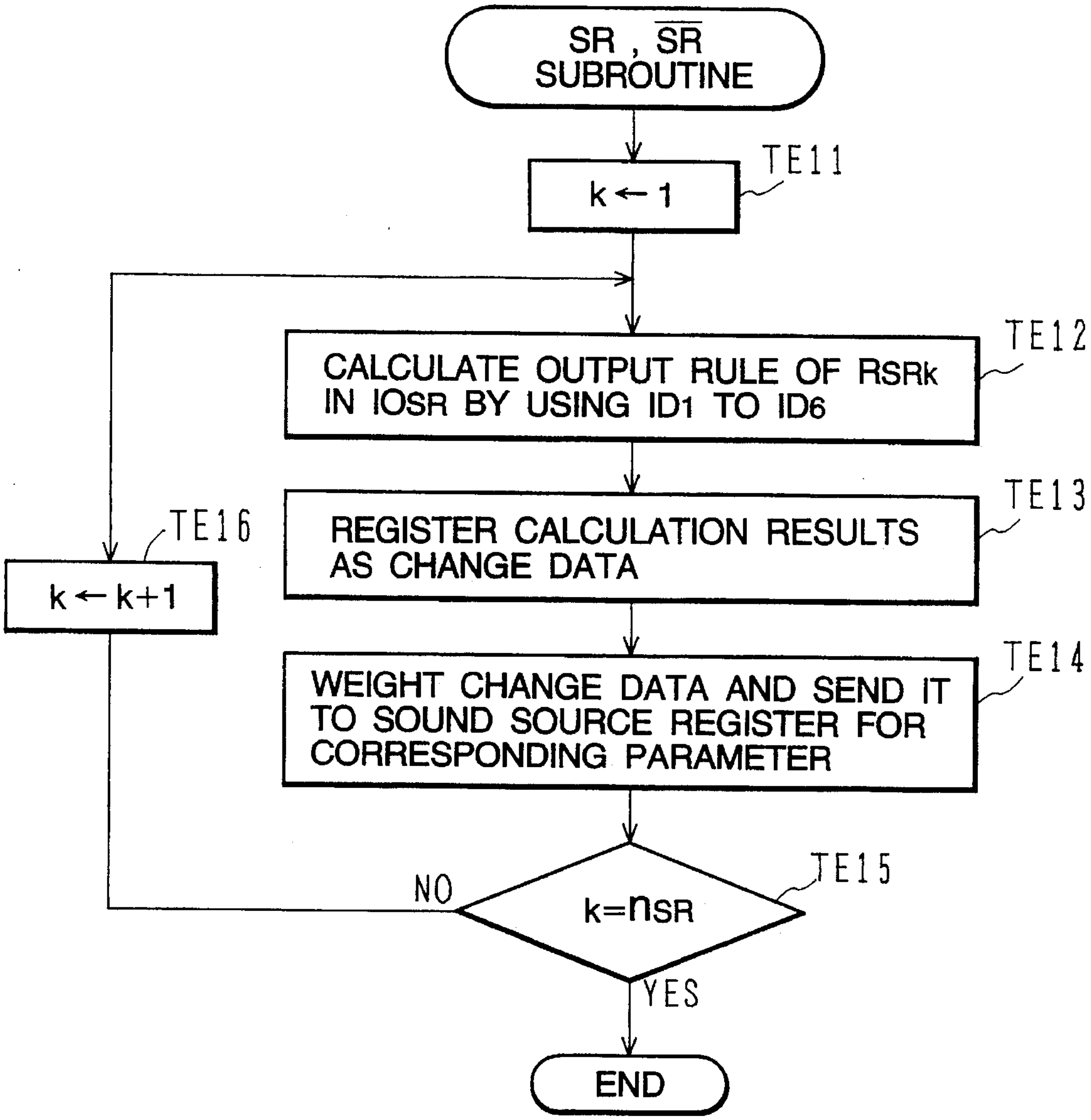
FIG. 15 is a flow chart of an SR and —SR subroutine used by the slider actuation event routine.

A subroutine for executing SR and —SR fuzzy calculations at Steps TE4 and TE5 will be described with reference to FIG. 15.

At Step TE11, "1" is stored in a register k to perform initialization. At Step TE12, of $IO_{SR}$ control rules indicating the relationships between the SR-th input rule and output rules, a k-th output rule is calculated in accordance with data $ID_1$ to $ID_e$.

At Step TE13, the calculation results obtained in the above manner are stored as change data.

At Step TE14, the change data is weighted and sent to a corresponding parameter register of the sound source circuit.

At Step TE15, it is checked whether the integer k is the number $n_{SR}$ of output rules. If not, the flow follows a NO arrow to advance to Step TE16 whereat the integer k is incremented by 1. Thereafter, the flow returns to Step TE12. If the integer k is equal to the number of $n_{SR}$ of output rules, this subroutine is terminated.

The fuzzy calculation to be performed after Steps TE7 and TE8 if there is a real time control rule at Step TE6, will be described. This fuzzy calculation is performed by the fuzzy processor shown in FIG. 2A.

Figure 16A:
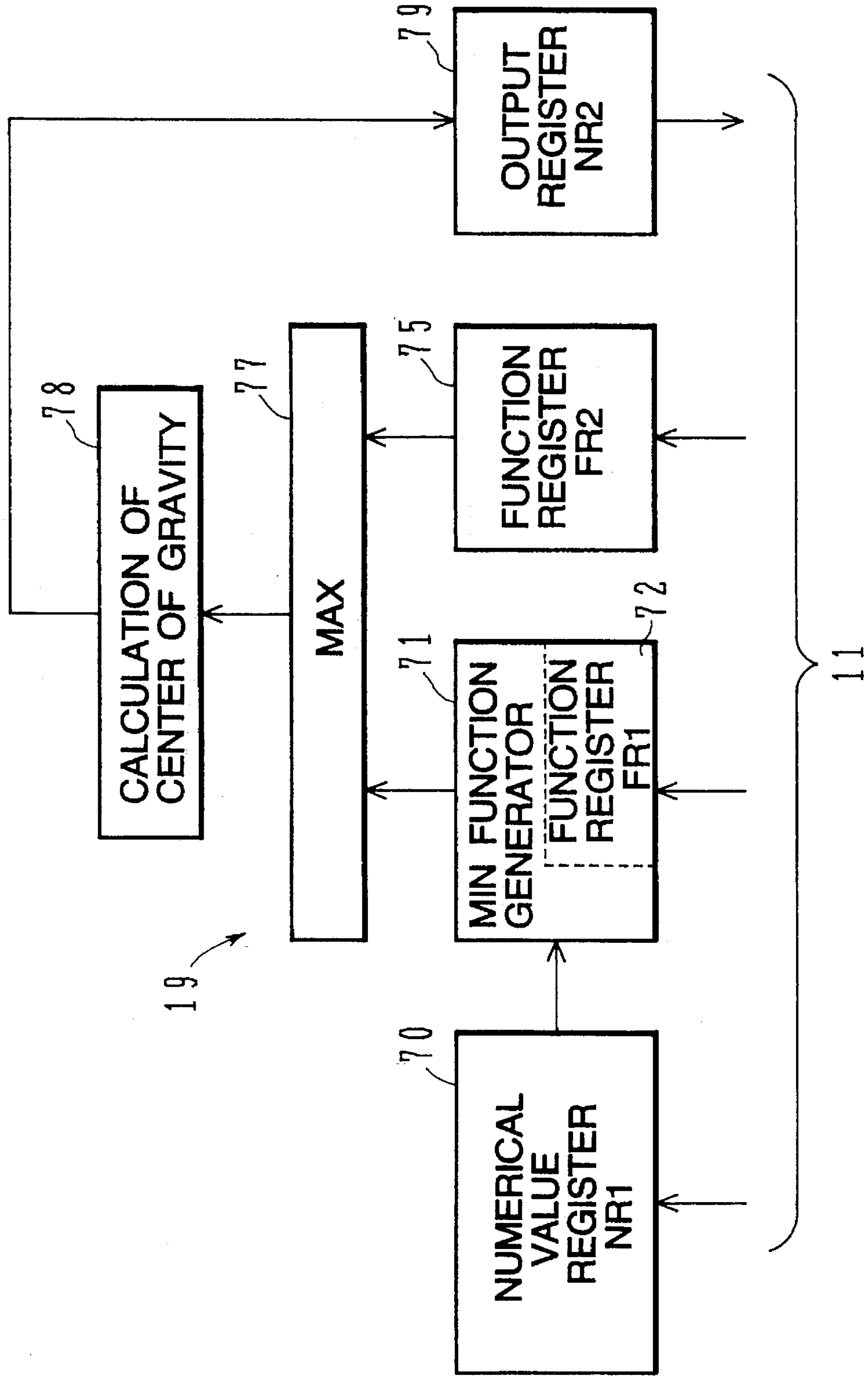

In FIG. 16A, registers 70, 71, 75, and 79 are connected to the bus line shown in FIG. 2. The function FR2 obtained by the fuzzy calculation of an input rule not to be controlled in real time as explained at Step TE7 in FIG. 14 is stored in the function regisnter 75. The function FR1 of an input rule to be controlled in real time as explained at Step TE8 is stored in the function register 72.

In playing a musical performance with the keyboard, a numerical number NR1 determined by the initial touch IT is set to the numerical value register 70.

Figure 16B:
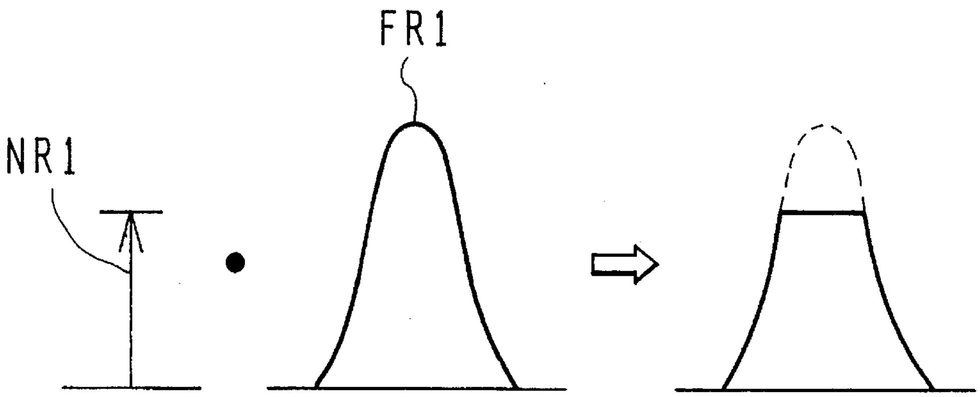

A min function generator circuit 71 has a function of selecting a minimum level from a plurality of numerical values. The min function generator circuit 71 performs a min calculation by using the function FR1 stored in the function register and the numerical value NR1 stored in the numerical value register 71. The function of the min function generator circuit 71 is illustrated in FIG. 16B. A min calculation is performed by using the function FR1 and the constant numerical value NR1 to obtain a function by truncating the function FR1 by the numerical value NR1.

The function register 75 stores therein the function FR2 already underwent the fuzzy calculation. A max calculation circuit 77 has a function of selecting a maximum level from a plurality of numerical values. The max calculation circuit 77 performs a max calculation by using the function generated by the min function generator circuit 71 shown in FIG. 16B and the function FR2 already underwent the fuzzy calculation and stored in the function register 75. The function of this circuit 71 is illustrated in FIG. 16C.

Figure 16C:
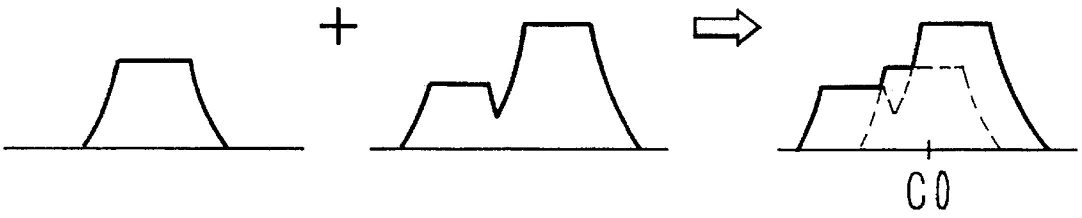

The function shape shown on the leftmost side in FIG. 16C is for the function generated by the min function generator circuit 71, and the function shape shown at the middle of FIG. 16C is for the function supplied from the function register 75. A max calculation of the two function shapes is performed to obtain a function shape shown on the rightmost side in FIG. 16C.

A center of gravity calculation circuit 78 calculates a center C0 of gravity of the function shape obtained by the max calculation, and sends the position of the center of gravity to the output register 79 as a numerical value NR2 of the output rule.

In the above manner, a fuzzy calculation for the tone color edit and a fuzzy calculation for a musical performance can be performed in real time.

Figure 17:
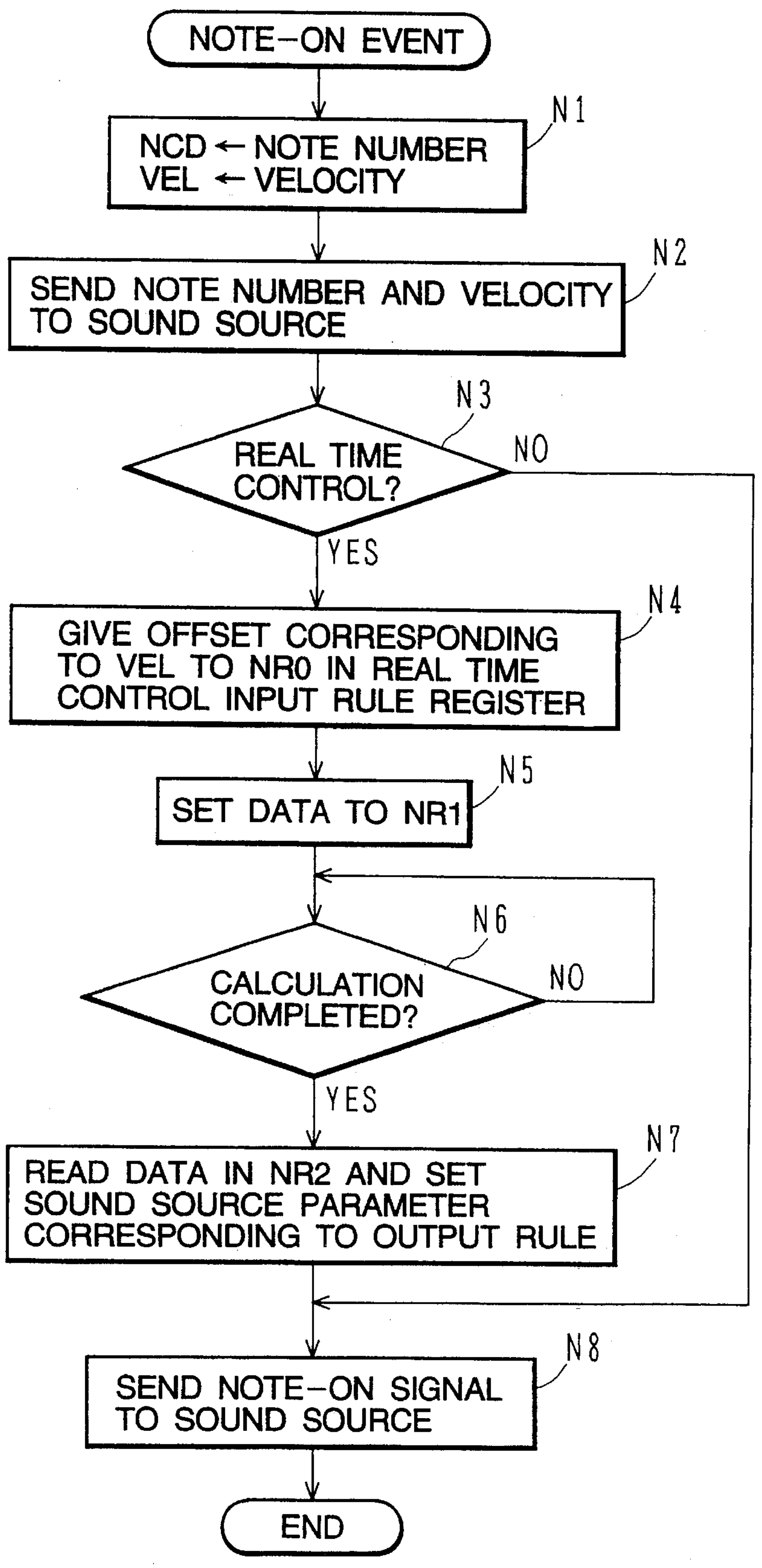
FIG. 17 is a flow chart explaining the operation upon occurrence of a note-on event.

FIG. 17 is a flow chart of a note-on event routine at key process Step S2 shown in FIG. 7. As a key of the keyboard is depressed, at Step N1, a note number representing a pitch and a velocity representing an initial touch are stored in registers NCD and VEL, respectively.

At Step N2, the note number and velocity are sent to the sound source circuit. The sound source circuit is now ready for generating a tone signal corresponding to the pitch and touch given by the player.

At Step N3, it is checked if there is a real time control instruction. If a real time control is to be performed, the flow follows a YES arrow to advance to Step N4 whereat an offset value corresponding to VEL is set to a standard value NR0 stored in a register provided for an input rule to be subjected to the real time control.

The new value is then set to the register NR1, and the real time fuzzy calculation described above is performed.

The fuzzy calculation including a center of gravity calculation requires some processing time. Therefore, it is checked at Step N7 whether the calculation has been completed. If not, the flow follows a NO arrow to repeat Step N7.

If the calculation has been completed, the flow follows a YES arrow to advance to Step N7 whereat the data obtained by the fuzzy calculation and stored in the register NR2 is supplied to the sound source circuit to set parameters for the output rules If there is no real time control instruction at Step N3, the flow follows a NO arrow to bypass Steps N4, N5, N6, and N7.

At step N8, a note-on signal is supplied to the sound source circuit to generate a tone signal.

Output rules to be controlled in real time in accordance with the velocity are selected from rules regarding an envelope attack rate, a filter cut-off frequency, a filter Q, a vibrato, and the like.

In this embodiment, the fuzzy calculation unit 5 shown in FIG. 1 generates parameters for the sound source circuit 6 by fuzzy calculations. Parameters may be generated not only by fuzzy calculations but also other artificial intelligence schemes.

The present invention has been described in connection with the preferred embodiments. The invention is not limited only to the above embodiments. It is apparent to those skilled in the art that various modifications, substitutions, combinations and the like can be made without departing from the scope of the appended claims.

I claim:

1. An electronic musical tone controller comprising:

a performance information generating means for generating a performance information signal responsive to playing a musical performance;

an input operator for inputting a degree of a sensory expression representing the quality of a musical tone and setting an input parameter corresponding to the degree of sensory expression, independent of the performance information signal responsive to the playing;

a controller for generating tone parameters based on said input parameter, the controller including a logical calculation unit;

a musical tone signal generator for generating a musical tone signal of said waveform determined by said tone parameters in response to said performance information signal; and said logical calculation unit performing a fuzzy calculation and generating at least one tone parameter using said input parameter set by said input operator, based on predetermined rules defining a correspondence between said input parameter and said at least one tone parameter.

2. An electronic musical tone controller according to claim 1, further comprising other input operators, each for inputting a degree of a sensory expression representing the quality of a musical tone and setting an input parameter independent of respective performance information representative of playing, wherein said controller generator tone parameters based on said input parameters.

3. An electronic musical tone controller according to claim 2, wherein said controller includes a rewritable table for storing relationships between said input parameters and said tone parameters.

4. An electronic musical tone controller according to claim 2, wherein said tone parameters comprise at least one of rising speed of an envelope, filter cut-off frequencies, filter Q valves, vibrato speed, vibrato depth, reverberation amount, and stereo same/opposite phase signal.

5. An electronic musical tone controller according to claim 2, wherein each of said input operators inputs a pair of degrees of opposite sensory expressions.

6. An electronic musical tone controller according to claim 3, wherein said rewritable table includes a first table storing relationships from input parameters to the tone parameters and a second table storing relationships from tone parameters to input parameters.

7. An electronic musical tone controller comprising:

an input operator unit for inputting a degree of a sensory expression representing the quality of a musical tone and setting an input parameter independent of respective performance information representative of playing;

a musical tone signal generator for generating a signal of said musical tone having a waveform characteristic which is determined by an inputted musical tone parameter., in response to each performance information representative of playing;

a definition unit for storing definition information defining a correspondence between said input parameter and at least one musical tone parameter related to the degree of a sensory expression; and a musical tone parameter generating means for generating said musical tone parameter corresponding to the value of said input parameter in accordance with said definition information.

8. An electronic musical tone controller according to claim 7, wherein said input operator unit generates a plurality of input parameters corresponding to a plurality of sensory expressions, and said musical tone parameter generating means generates said musical tone parameter corresponding to a combination of said plurality of input parameters.

9. An electronic musical tone controller according to claim 8, wherein said musical tone parameter generating means generates said musical tone parameter corresponding to a combination of said plurality of input parameters, said musical tone signal generator generates said musical tone signal in accordance with said plurality of musical tone parameters, and when one of said input parameters changes, said musical tone parameter generating means newly generates all said musical tone parameters related to said one input parameter by said definition information.

10. An electronic musical tone controller according to claim 7, wherein said definition unit has a setting operator unit for setting said definition information.

11. An electronic musical tone controller according to claim 10, wherein said definition information set by said setting operator unit is information for designating which sensory expression among a plurality of sensory expressions is entered as said input parameter.

12. An electronic musical tone controller according to claim 7, wherein said definition information is information indicating a tone parameter name of said sensory expression for said input parameter, said electronic musical tone controller further comprising display means for displaying said concept name.

13. An electronic musical tone controller according to claim 12, wherein said definition unit further includes a setting operator unit for setting said tone parameter name.

14. An electronic musical tone controller according to claim 7, wherein said definition unit includes:

a storage unit for storing a plurality of definition information sets;

a tone color select operator unit for selecting a basic color tone to be processed in accordance with the degree of said sensory expression entered by said input operator unit; and selecting means for selecting one set of said definition information from said storage unit in accordance with said tone color selected by said tone color select operator unit, and wherein said musical tone parameter generating means generates said musical tone parameter in accordance with said one definition information selected by said selecting means.

15. An electronic musical tone controller comprising:

an input operator unit for inputting a degree of a sensory expression representing the quality of a musical tone and generating an input parameter;

a musical tone signal generator for generating a signal of said musical tone having a waveform which is determined by an inputted musical tone parameter;

a definition unit for storing definition information defining a correspondence between said input parameter and at least one musical tone parameter related to the degree of a sensory expression; and a musical tone parameter generating means for generating said musical tone parameter corresponding to the value of said input parameter in accordance with said definition information, wherein said musical tone parameter generating means generates a plurality of kinds of musical tone parameters, said musical tone signal generator generates said musical tone in accordance with said plurality of kinds of musical tone parameters and said definition information is information for defining a kind and manner of change of said musical tone parameter changing with the value of said input parameter among said plurality of kinds of musical parameters.

16. An electronic musical tone controller according to claim 15, wherein said definition unit further includes a setting operation unit for setting the kind and rate of change of said musical tone parameter changing with the value of said input parameter.

17. An electronic musical tone controller comprising:

an input operator unit for generating a plurality of input parameters for designating tone color;

a performance operator unit for generating performance information in response to playing a musical performance;

a musical tone signal generator for generating a musical tone signal having a waveform determined by an inputted musical tone parameter;

a definition unit for storing definition information defining a correspondence between said plurality of input parameters and said performance information, and said musical tone parameter;

preparatory information generating means for generating preparatory information corresponding to a combination of said plurality of input parameters; and musical tone parameter generating means for generating said musical tone parameter in accordance with said definition information and in accordance with said preparatory information and said musical performance information.

18. An electronic musical tone controller according to claim 17, wherein said performance information includes touch information, and said musical tone parameter generating means generates said musical tone parameter in accordance with said touch information.

19. An electronic musical tone controller according to claim 17, wherein said preparatory information generating means includes a CPU for controlling said preparatory information, and said musical tone parameter generating means includes musical tone parameter calculating means for controlling a generation of said musical tone parameter independently from said CPU.

* * * * *